United States Patent
Hermansson et al.

[11] Patent Number: 5,987,319
[45] Date of Patent: Nov. 16, 1999

[54] CALL-SETUP METHOD IN A DIGITAL CELLULAR RADIO COMMUNICATION SYSTEM

[75] Inventors: Hans Hermansson, Enskede Gärd, Sweden; Stefan Bruhn, Nuremberg, Germany; Tor Björn Minde, Gammelstad, Sweden

[73] Assignee: Telefonaktiebolaget LM Ericsson, Stockholm, Sweden

[21] Appl. No.: 08/845,387

[22] Filed: Apr. 25, 1997

[30] Foreign Application Priority Data

Apr. 26, 1996 [SE] Sweden .................................. 9601606

[51] Int. Cl.⁶ ....................................................... H04Q 7/00
[52] U.S. Cl. ............................ 455/422; 455/450; 455/62; 370/329
[58] Field of Search ..................................... 455/422, 436, 455/440, 441, 450, 452–453, 455, 509, 516, 62; 370/329, 335, 337, 344, 347–348, 431, 437, 441–443

[56] References Cited

U.S. PATENT DOCUMENTS 5,289,462  2/1994  Ahmadi et al. .
5,327,576  7/1994  Uddenfeldt et al. .

FOREIGN PATENT DOCUMENTS

WO95/08807  3/1995  WIPO .
WO96/10305  4/1996  WIPO .
WO96/10320  4/1996  WIPO .
WO97/13388  4/1997  WIPO .

OTHER PUBLICATIONS

J. Dunlop et al., "Estimation of the Performance of an Adaptive Air Interface in Mobile Radio," Alcatel Radiotelephone, pp. 1–5.

D.J. Goodman et al., "Quality of Service and Bandwidth Efficiency of Cellular Mobile Radio with Variable Bit–Rate Speech Transmission," IEEE (1983).

J. Irvine et al., "Implementation Considerations for Gross Rate Link Adaptation," IEEE, pp. 1766–1770 (1996).

E. Le Strat et al., "Distance Based Dynamic Adaptation of the Air Interface in TDMA," Alcatel Mobile Communication France, pp. 208–215.

*Primary Examiner*—Doris H. To
*Attorney, Agent, or Firm*—Burns, Doane, Swecker & Mathis, L.L.P.

[57] ABSTRACT

A call-setup method in a digital cellular radio communication system determines a plurality of parameters defining the current state of the system. By evaluating and combining these parameters into a communication resource request, a communication resource that best matches the request may be allocated in order to optimize system resource usage and/or service quality.

11 Claims, 1 Drawing Sheet

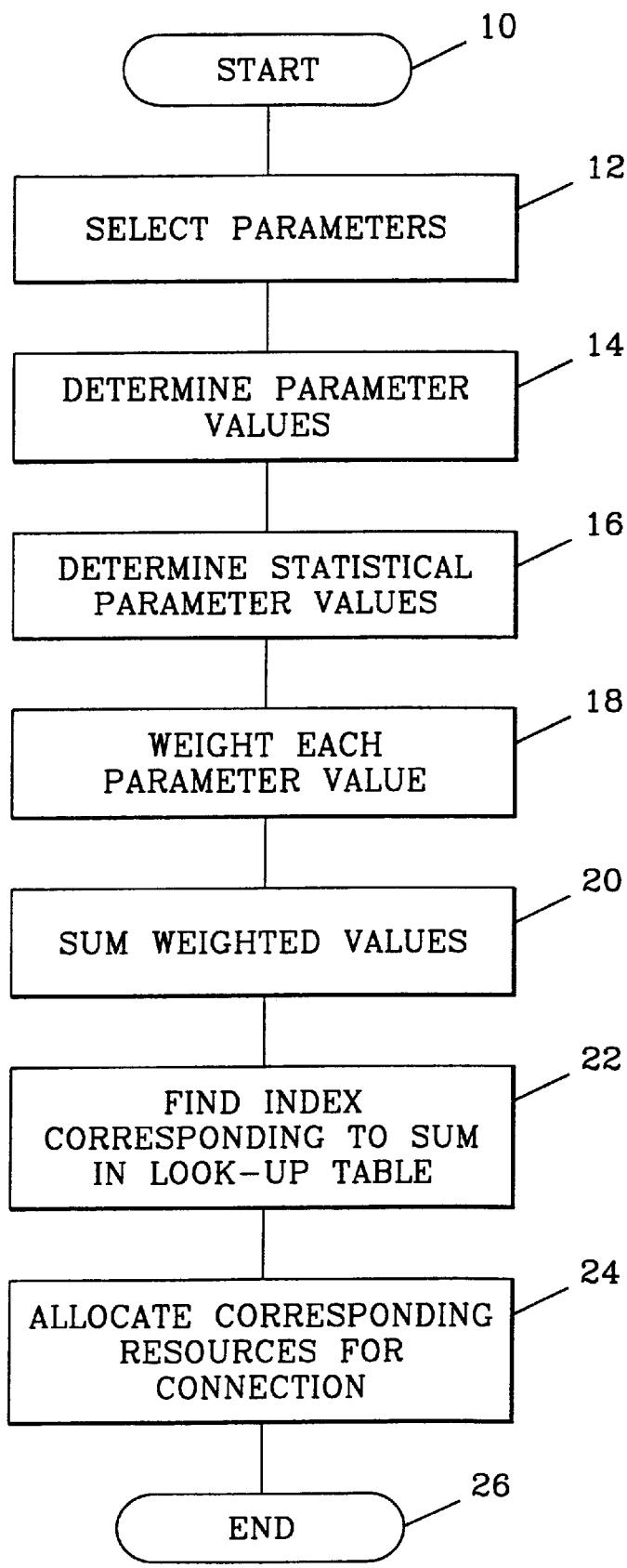

5,987,319

CALL-SETUP METHOD IN A DIGITAL CELLULAR RADIO COMMUNICATION SYSTEM

TECHNICAL FIELD

The present invention relates to a call-setup method in a digital cellular radio communication system.

BACKGROUND

In present digital cellular mobile radio communication systems, such as the GSM and D-AMPS systems, a call-setup allocates a fixed gross bit rate channel for a subsequent fixed bit rate speech service. This implies that the net bit rate conveying the speech information and also the amount of added redundant bits which are used for channel error protection are fixed. A compromise has to be made between the quality of the speech service, the gross bit rate and the degree of channel error protection:

On one hand a maximum speech quality requires a high net bit rate and a high gross bit rate.

On the other hand the system resources are limited and the system should be able to accommodate a very large number of users at any given time.

Since the total maximum gross bit rate that simultaneously can be transmitted by the system is limited, the system capacity is limited to a fixed maximum number of users that may simultaneously use the system within one cell. In order to accommodate a maximum number of users of the speech service at any given time, the net bit rate, the degree of channel error protection and thus the channel gross bit rate are set to certain minimum values which still guarantee a certain minimum degree of speech quality under various radio conditions.

The fixed setting of gross bit rate, degree of channel error protection and net bit rate and service causes the following problems:

The amount of channel error protection is fixed to such value that a certain level of speech quality is maintained in situations of a low C/I level, e.g. at cell borders. In some situations, however, a higher degree of channel error protection (with the cost of a lower net bit rate) could give a higher speech quality (more robust transmission). On the other hand, in situations of a high C/I level the degree of channel error protection is unnecessarily high, a considerable amount of protection bits being wasted. In such a case the speech service quality could be higher at a higher net bit rate (more accurate speech encoding) and a lower degree of channel error protection.

The fixed gross bit rate causes a hard limit of possible simultaneous users. Thus, in situations of high system load the risk of overload is high. An overload may result in failures of connection establishments and lost connections. In the opposite situation of low system load there is a lot of unused system capacity which is in principle free to be used for transmission at a higher gross bit rate and therefore a higher service quality.

The current inflexible use of a fixed speech service at a fixed gross bit rate and a fixed degree of channel error protection makes it impossible for an operator to offer selected services that could depend on the current situation, e.g. network load, time of day and date, location, etc. Moreover, it is also impossible for the user to select a more user-suited service.

In the current inflexible system speech decoding of the bit stream received from the mobile station is performed at the network side. This ignores the kind and the capabilities of the other terminal. Such a system may lead to quality degrading due to speech codec tandem configurations, e.g. in the case of a mobile station-mobile station connection.

SUMMARY

An object of the present invention is to provide a more flexible call-setup method in a digital cellular radio communication system.

This object is solved by the features of claim 1.

Briefly, a number of parameters defining the present state of the system are determined before call-setup and these parameters are used to optimally allocate communication resources for the call.

BRIEF DESCRIPTION OF THE DRAWING

The invention, together with further objects and advantages thereof, may best be understood by making reference to the following description taken together with the accompanying drawing, which illustrates the method in accordance with the present invention in the form of a flow chart.

DETAILED DESCRIPTION

The invention will now be described in detail, mostly with reference to the GSM and D-AMPS systems. However, the invention is also applicable to any other digital radio communication system (FDMA, TDMA, CDMA), such as PDC (Pacific Digital Cellular), IS-95 (CDMA) or even satellite systems.

The following description will concentrate on three specific examples of resource allocation, namely offered degree of channel error protection, offered gross bit rate and offered service level.

A. ADAPTATION OF CHANNEL ERROR PROTECTION

In order to adapt the degree of offered channel error protection to the current situation during call-setup, at least some of the following parameters are determined:
  current location of mobile station (MS), e.g.
    indoor/outdoor
    population density of serving cell
    MS distance to cell center (antenna)
    MS global position
  expected mobility of MS
  current channel quality, e.g.
    C/I level
    bit error rate (BER)
  possible battery-saving mode of MS These parameters are combined and possibly supplemented by other statistical data, and based on this description of the current state of the system a suitable degree of channel error protection is allocated. This procedure will be described in more detail below. A few examples will illustrate how the above mentioned parameters may be used.

Example A1

A current location of the mobile station is classified as indoor, and the current C/I level measurement indicates good radio channel conditions. Thus, a low degree of channel error protection and a high net bit rate (accurate speech encoding) is chosen for the subsequent connection.

Example A2

The current location of the mobile station is classified as close to the serving base station (and distant from the cell border), and the expected mobility of the mobile station is low. Thus, good radio channel conditions may be expected for the subsequent connection, which leads to selecting a low degree of channel error protection and a high net bit rate.

Example A3

The current location of the mobile station is classified as being in a cell in a highly populated area, and the expected mobility of the mobile station is high. This situation indicates a high probability of strongly changing radio channel conditions during the subsequent connection. Thus, it is wise to select a high degree of channel error protection and a low net bit rate.

Example A4

The mobile station is in a battery-saving mode. This fact implies that a transmission at low channel error protection is requested, since a low channel error protection implies less processing of redundant bits and therefore saves battery. If the current C/I level indicates acceptable radio channel conditions this request is granted and a low channel error protection and a correspondingly high net bit rate are selected.

B. ADAPTATION OF GROSS BIT RATE

In order to adapt the gross bit rate used for the service to the current situation during call-setup at least some of the following parameters may be determined:
current location of MS, e.g.
    indoor/outdoor
    population density of serving cell
    MS distance to cell center (antenna)
    MS global position
expected mobility of MS
current channel quality, e.g.
    C/I level
    bit error rate (BER)
possible battery-saving mode of MS
system load
time of day and date
Note that the first four parameters are the same as in case A above. As in case A these parameters are combined and possibly supplemented by some other statistical data for obtaining a decision regarding the gross bit rate to be allocated for the requested service. For example, in a TDMA based system, e.g. GSM, D-AMPS, the gross bit rate may be adjusted by allocation of an appropriate number of TDMA time slots. A few examples are given below.

Example B1

The current system load is high and the current C/I level indicates an acceptable radio channel quality. A low gross bit rate is allocated for transmission at a relatively low service quality.

Example B2

The system load is relatively low and the time of day or date indicates that it is safe to assume that the system load will remain low for the duration of a call. In this situation a high gross bit rate may be allocated for the service. The high gross bit rate may be used to compensate for a poor radio channel by offering a high degree of channel error protection (robust encoding) and keeping the net bit rate at a low level. On the other hand, if the radio channel is good, a high quality service at a high net bit rate may be supported.

Example B3

The mobile station is in a battery-saving mode and therefore requests a low rate service with transmission at low channel error protection. If the current C/I level indicates acceptable radio channel conditions, the request is granted and a low gross bit rate is chosen for transmission.

C. ADAPTATION OF SERVICE LEVEL

It is desirable to give the operator the freedom to offer a varying range of services, for example:
    a low gross bit rate/low speech quality service
    a robust speech service that allocates as much gross bit rate as required to meet a certain quality level under the current radio channel conditions
    a high quality speech service
    combined speech and data services
The following parameters are relevant in deciding what service to use:
current location of MS, e.g.
    indoor/outdoor
    population density of serving cell
    MS distance to cell center (antenna)
    MS global position
expected mobility of MS
current channel quality, e.g.
    C/I level
    bit error rate (BER)
possible battery-saving mode of MS
system load
time of day and date
user request, e.g.
    a default service
    a specific service according to individual user request
    a specific service according to individual user profile
    a specific service according to an automatic request of the MS, e.g. a battery-saving mode
Note that case C differs from case B only in the last parameter (user request). The following examples illustrate this case further.

Example C1

The current system load is high and the current C/I level indicates an acceptable radio channel quality. A low gross bit rate/low quality service, e.g. a half rate channel is chosen.

Example C2

The system load is relatively low and the current mobility of the mobile station indicates that strongly varying radio channel conditions are to be expected during the connection. Thus, a robust speech service is chosen with a high gross bit rate and a high degree of channel error protection.

Example C3

The subscriber has an important call to make (for example a business call) and requests highest possible quality regardless of costs. A high gross bit rate with high quality speech encoding and high channel protection is chosen. Later he wants to make a private call and requests the least expensive service. A low gross bit rate with low quality speech encoding and low channel protection is chosen.

DETERMINING CALL-SETUP PARAMETERS

The above mentioned parameters may, for example, be determined in the following ways:

Current Location of MS

In a well-planned network the indoor/outdoor location of a mobile station is known with the knowledge of the current cell. For example, in a GSM system this information could be requested from the Mobility Management.

Furthermore, in a well-planned network knowledge of the current cell also specifies whether the cell is in a highly populated area or not. For example, in a GSM system this information could be requested from the Mobility Management.

The current systems determine a Timing Advance parameter on the network side This parameter may be used to estimate the distance between base station and mobile station. With knowledge of the cell topology it is possible to deduce an estimate of the distance to the cell center or cell border.

The mobile station may figure out its current global position by means of GPS (Global Positioning System) or triangulation (involving the three closest base stations).

Expected Mobility of MS

The expected mobility of the mobile station may be deduced from the knowledge of the "indoor/outdoor" situation. In a detected indoor situation the mobility parameter could be set to a low value. In the opposite case a detected outdoor situation would set the mobility parameter to a higher value.

Another indicator of the mobility could be the current speed of the mobile station. This speed could be determined by monitoring a possible variation of the Timing Advance parameter, a possibly detected Doppler radio frequency shift, or by applying a differential GPS measurement in the mobile station.

Still another way to estimate the mobility parameter is to count the number of cell changes during the connection and to apply a statistical estimate of this parameter.

The last two methods require some type of preliminary connection to perform mobility measurements. This is possible to do before the call is finally setup. It can also be done regularly on the control channel.

Current Channel Quality

In the current systems there are available measurements of the signal strength of the received radio signal, e.g. RXLEV in GSM. This measurement could be used as indicator of the current C/I level.

In the current systems there are available measurements of the bit error rate, e.g. RXQUAL in GSM. This measurement is an indicator of the current bit error rate.

Possible Battery-saving Mode of MS

This parameter may become active, for example on a detected bad battery status of the mobile station or a user selected long-life mode of the mobile station.

System Load

Information about the current system load may, for example, in a GSM system be obtained from the Radio Resource Management. A suitable value for this parameter could be the ratio between the number of currently allocated gross bit channels and the number of existing gross bit channels within the current cell. Similarly, the load in neighboring cells, calculated in the same way, could also be taken into consideration.

Time of Day and Date

Provided by system clock.

User Request

Type of call, requested quality level, VIP call, requested cost level.

Statistical parameters may be formed by collecting parameters and forming long or short term averages, e.g. running averages. It is also possible to include other knowledge into the generation of the statistical parameters, e.g. public holidays, dates of fee changes, studies about subscriber behavior, etc.

DECISION ALGORITHM

The decision about the degree of channel error protection, gross channel allocation and the actual service selection may be based on an index, which is calculated in accordance to the following algorithm (also refer to drawing):

1. Select (step 12) a set of at least two parameters and possibly a set of statistical parameters to base the decision on.
2. Determine (step 14) a numerical value representing the current status of each respective parameter.
3. Look up (step 16) the values of the statistical parameters to be used.
4. Weight (step 18) each of the parameter values to be taken into account by a suitable weighting factor, which stands for the importance of the respective parameter.
5. Sum (step 20) up all weighted parameter values.
6. Compare the weighted sum to predefined values in the look-up table and find (step 22) that table element which is closest to the weighted sum. The index of this table element is the required index. This index will define (step 24) the service to be allocated.

Note that the selection of parameters and statistical parameters to base the decision on, the weighting factors as well as the look up table may be fixed or adaptive.

It is also possible to generalize the above method by examining all the system components which are involved in the subsequent connection. With knowledge of capability of the various components, the connection may be established in a mode which offers a maximum quality of service at a minimum of required system resources.

One such example is an MS-MS connection. During call-setup the speech coding capabilities of both terminals are determined by means of a suitable protocol. If the terminals share some common speech coding method, it is possible to avoid the decoding and re-encoding in the transcoder unit on the network side. Instead the terminals could agree, by a suitable protocol, on the speech coding method to be used. During the connection the network transfers the bit stream in a transparent mode from one terminal to the other. Transparent means that no source decoding and re-encoding is performed on the network side. The gain is that a possible quality degraduation due to tandem configurations may be avoided.

The described method may also be generalized by noting that the flexibility obtained at call-setup may also be obtained during a call by repeating the method and dynamically reallocating resources during said call. This allows a reaction on parameter changes, which would help to maintain a high service quality during the entire connection time and to achieve a more efficient resource usage. For example, if radio conditions get worse during a high cost (VIP, "Gold Card") call a higher gross bit rate may be reallocated to enable stronger channel protection. This may even be done by "stealing" gross bit rate from a low cost call.

It is possible to use either different or the same speech encoding, channel protection, gross bit rate, etc. in uplink and downlink directions.

A further service that is possible due to the service flexibility offered by the present invention is GSM/DECT or D-AMPS/DECT phones. On incoming calls the call-setup procedure determines if DECT access is possible and desirable instead of a GSM or a D-AMPS connection. In such a case the call is forwarded to the DECT system.

The benefit of the described flexibility of channel error protection, gross channel allocation and service selection at call-setup is a better usage of system resources. This helps to provide:

A maximum of available service quality at any given time and any given location.

A more uniform service quality over the network.

A higher system capacity in terms of simultaneously accomodated users.

Moreover, flexibility at call-setup may give:

The operator the possibility to offer selected ranges of services depending on the current situation.

The user a range of selectable services.

It will be understood by those skilled in the art that various modifications and changes may be made to the present invention without departure from the spirit and scope thereof, which is defined by the appended claims.

What is claimed is:

1. A call-setup method for speech connections in a digital cellular radio communication system, the method comprising the steps of:
    determining parameters of:
        a current location of a mobile station,
        a speech service requested, and
        previously collected statistical data reflecting a probable current state of the system;
    evaluating and combining the parameters into a communication resource request; and
    allocating a communication resource that best matches the communication resource request to optimize system resource usage and/or speech service quality.

2. The method of claim 1, wherein the communication resource is the degree of channel error protection offered by the system.

3. The method of claim 1, wherein the communication resource is the gross bit rate offered by the system.

4. The method of claim 1, wherein the communication resource is the service level offered by the system.

5. The method of claim 1, wherein the parameters also include at least one of:
    an expected mobility of the mobile station;
    a channel quality parameter;
    expected system load from previous experience;
    actually measured current system load;
    a possible battery-saving mode of the mobile station; and
    time of day and date.

6. The method of claim 5, further comprising the step of determining the capabilities of at least some of the system components involved in a subsequent connection.

7. The method of claim 5, wherein the parameters include parameters on conditions in neighbor cells of a cell in which the call-setup is attempted.

8. The method of claim 5, further comprising the step of repeating the method during a call for dynamic reallocation of another communication resource.

9. The method of claim 1, wherein the digital cellular radio communication system is a TDMA system.

10. The method of claim 1, wherein the digital cellular radio communication system is a CDMA system.

11. The method of claim 1, wherein the digital cellular radio communication system is a FDMA system.

* * * * *